UNITED STATES PATENT OFFICE.

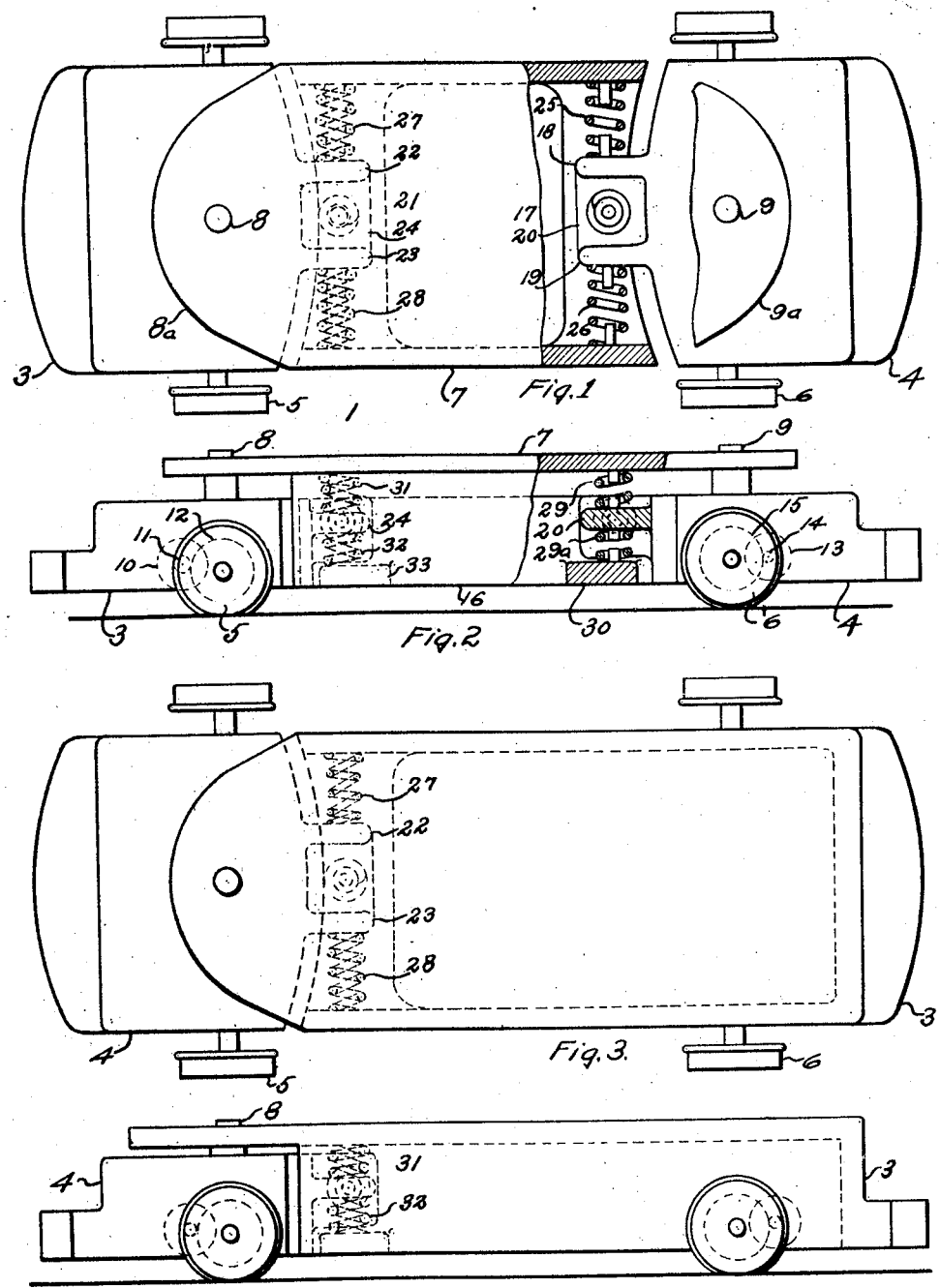

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

STORAGE-BATTERY LOCOMOTIVE.

1,352,452.     Specification of Letters Patent.     Patented Sept. 14, 1920.

Application filed April 5, 1917. Serial No. 159,965.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Storage-Battery Locomotives, of which the following is a specification.

My invention relates to locomotives and particularly to storage-battery locomotives for service in mines.

One object of my invention is to provide a locomotive of low height which shall be simple, rugged and economical in construction and efficient and reliable in operation.

Another object of my invention is to provide a locomotive of the above indicated character that shall be provided with two bodies having propelling trucks, a storage battery mounted on one of said bodies, and a pivotal connection between the bodies and trucks that is disposed so as to support a portion of the weight of the section containing the storage battery on the body and truck associated therewith.

A further object of my invention is to provide a storage-battery locomotive that shall be provided with two two-wheel propelling trucks, a storage battery mounted on, and disposed between, the propelling wheels of said trucks and resilient means disposed between bodies mounted on the two trucks for exerting a force tending to maintain the same in longitudinal and horizontal alinement with each other.

Locomotives intended for service in mines should be of minimum height and rugged in construction in order to meet the requirements of the service demanded of them.

In many cases, it is impracticable to operate a locomotive that is supplied with energy from a trolley conductor and, in such cases, a locomotive provided with a cable and a reel or a storage-battery locomotive is resorted to. The storage-battery locomotive is the only practical solution of the problem where the locomotive is operated over great distances. However, a storage battery which will serve for propelling a locomotive is of relatively great weight and takes up considerable room. Thus, it is essential to have the storage battery conveniently disposed on the locomotive so as not to increase the height of the same and to equitably distribute the weight of the same on the various wheels of the locomotive.

In a low-height storage-battery locomotive constructed in accordance with my invention, the weight of the battery is equitably distributed on the various pairs of wheels of the locomotive and is so disposed as not to increase the height of the locomotive or to interfere with the apparatus for controlling the same. In the accompanying drawing, Figure 1 is a plan view, partially in section, of a locomotive constructed in accordance with my invention; Fig. 2 is a side elevational view, partially in section, of the locomotive illustrated in Fig. 1; Fig. 3 is a plan view of a locomotive embodying a modification of my invention; and Fig. 4 is a side elevational view of the locomotive shown in Fig. 3.

Referring to Figs. 1 and 2 of the drawing, a locomotive 1 embodies two low-height bodies 3 and 4 constituting the similar end sections of the locomotive, which are respectively provided with two-wheel supporting trucks having pairs of driving wheels 5 and 6, and a central section 7 which is respectively connected to the bodies 3 and 4 by means of pivotal connections 8 and 9. The truck of the body 3 is provided with a motor 10 which is connected to the pair of driving wheels 5 by means of a pinion 11 and a gear wheel 12, and the truck of the body 4 is provided with a motor 13 which is connected to the pair of driving wheels 6 by means of a pinion 14 and a gear wheel 15.

The central section 7 embodies a body portion 16 for supporting the storage battery which supplies energy to the locomotive and two end projections 8ᵃ and 9ᵃ which project over the bodies 3 and 4.

A projection 17, which extends from the body 4, is provided with two vertical ribs 18 and 19 and a horizontal rib 20. The body 3 is provided with a similar projection 21 which embodies two vertical ribs 22 and 23 and a horizontal rib 24. Four springs, 25, 26, 27 and 28 are respectively disposed between the sides of the central portion 7 and the vertical ribs 18, 19, 22 and 23 for exerting a force tending to maintain the trucks and the bodies 3 and 4 and the central section 7 in horizontal alinement with each other. A spring 29 is disposed between the rib 20 and the projection 9ª of the central section 7 and a similar spring 29ª is disposed between the cross-piece 30 on the central section 7 and the rib 20 for exerting a force tending to maintain the end section or body 4 and its truck and the central section 7 in vertical alinement with each other. A spring 31 is disposed between the rib 24 and the projection 8ª, and a spring 32 is disposed between the cross-piece 33 on the central section 7 and the rib 24 for exerting a force tending to maintain the end section or body 3 and its truck and the central section 7 in vertical alinement with each other.

Although springs 25, 26, 27, 28, 29, 29ª, 31 and 32 are provided for exerting a force tending to maintain the two trucks and the bodies or end sections 3 and 4 and the central section 7 in horizontal and vertical alinement with each other, the pivotal connections 8 and 9 may be disposed relative to the driving wheels 5 and 6 so as to maintain the various parts in alinement with each other.

In referring to Figs. 3 and 4, reference characters are used which correspond to those serving to designate the various parts of the locomotive illustrated in Figs. 1 and 2. In the modification illustrated in Figs. 3 and 4, the central section 7, which is illustrated in Figs. 1 and 2 of the drawing as a separate body, is constructed as an integral part of the body 3, thus dispensing with the pivotal connection 9 and the spring connections between the projection 17 and the central section 7. The body 3 is pivotally connected to the body 4 by means of the pivotal connection 8, and the two bodies 3 and 4 and the trucks carrying them are restrained from vertical and from horizontal movement relative to each other by means of the springs 27, 28, 31 and 32.

Modifications in the structure and arrangement and location of parts may be made within the spirit and scope of my invention and such modifications are intended to be covered by the appended claims.

I claim as my invention:

1. In a low-height locomotive, the combination of a low-height end section, a two-wheel truck supporting the same, another low-height section pivotally connected to said end section, a two-wheel truck connected to said other section, propelling means for the trucks, and means tending to maintain said trucks and sections in alinement.

2. In a low-height locomotive, the combination of a low-height end section, a two-wheel truck supporting the same, another low-height section having means thereon for carrying storage-batteries or the like, a two-wheel truck connected to said other section, a propelling means mounted on each of said trucks, and yieldable means tending to maintain said trucks and sections in alinement.

3. In a low-height locomotive, the combination of a low-height end section, a two-wheel truck supporting the same, another low-height section having means thereon for carrying storage-batteries or the like, a two-wheel truck connected to said other section, a propelling means mounted on each of said trucks, and resilient means acting laterally and vertically and tending to maintain said trucks in longitudinal and horizontal alinement.

4. In a low-height locomotive, the combination of a low-height end section, a truck for supporting the same, another low-height section having means thereon for carrying storage-batteries and the like, means whereby said carrying means is pivotally connected to said end section, a truck connected to said other section, and propelling means for said locomotive.

5. In a low-height locomotive, the combination of a low-height end section, a truck for supporting the same, another low-height section having means thereon for carrying storage batteries and the like, said carrying means having an end projecting over and supported on said end section, means for pivotally connecting said carrying means to said end section, a truck connected to said other section and propelling means carried by said trucks.

6. In a low-height storage-battery locomotive, the combination of a low-height end section, a two-wheel truck for supporting the same, another low-height section having means mounted thereon for carrying storage batteries and the like, said carrying means having an end projecting over and supported on said end section, means for pivotally connecting said carrying means to said end section, a two-wheel truck connected to said other section, propelling means mounted on said trucks, and means tending to maintain said trucks and sections in alinement.

7. In a low-height locomotive, the combination of a low-height end section, a truck connected to and supporting the same, a second low-height section pivotally connected to said end section, a truck connected to said second section, propelling means for the trucks, and means tending to maintain said trucks and sections in alinement comprising vertical and horizontal ribs on one of said sections, and vertical and horizontal springs between said ribs and the other section.

8. In a locomotive, two two-wheel propelling trucks, a propelling motor mounted on each of said trucks, a pivotal connection between said trucks, and resilient means disposed between said trucks for exerting a force tending to maintain them in horizontal and in longitudinal alinement with each other.

9. In a storage-battery locomotive, two pairs of propelling wheels, trucks associated with said propelling wheels, said propelling wheels serving as the only support for the locomotive, a storage battery located between said pairs of driving wheels for supplying energy to the locomotive, said pairs of driving wheels being pivotally connected and resilient means located between said pairs of driving wheels for exerting a force tending to maintain said trucks in horizontal and in longitudinal alinement with each other.

In testimony whereof, I have hereunto subscribed my name this 26th day of March 1917.

GEORGE H. F. HOLY.